United States Patent Office 3,694,354
Patented Sept. 26, 1972

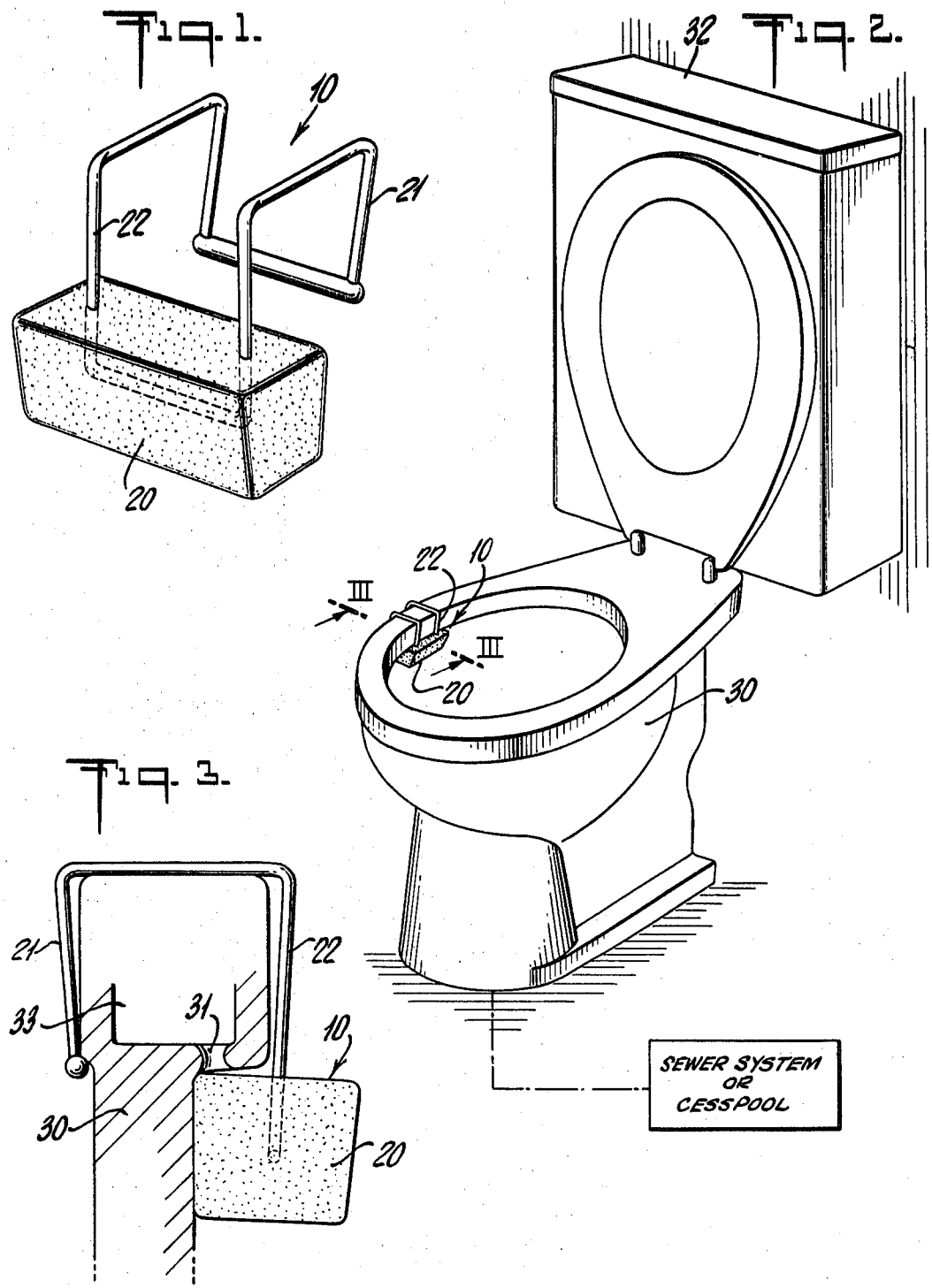

---

3,694,354
METHOD FOR TREATING SEWAGE
Albert C. Nolte, Jr., Oyster Bay Cove, N.Y., assignor to Elton Industries Corporation, Jericho, N.Y.
Original application May 15, 1969, Ser. No. 824,999, now Patent No. 3,604,021. Divided and this application Apr. 6, 1971, Ser. No. 131,785
Int. Cl. C02c 1/02
U.S. Cl. 210—18      4 Claims

ABSTRACT OF THE DISCLOSURE

A tablet for use in a toilet, urinal or the like which has an ingredient a substance for increasing the decompositional rate of the waste material in a cesspool sewage system or the like.

---

This application is a division of application Ser. No. 824,999, filed May 15, 1969, now U.S. Pat. No. 3,604,021.

This invention relates to urinal tablets or the like and more precisely, to such tablets which have as a constituent element a substance which effects a higher degree of decomposition of the waste material.

Today, the treatment of waste material that is discharged into sewer systems, cesspools and the like has become of prime importance.

In many instances, waste material discharged from toilets, urinals and the like is conveyed by sewage systems directly to river systems without any depollution processing of the waste products. This type of river discharge greatly adds to the problem of water pollution and is totally undesirable. In other situations, waste is either introduced into a sewage disposal system which treats the waste matter in order to purify it whereby preventing pollution or it enters a cesspool, or the like. When it enters a cesspool, the slow bacteriological decomposition of the waste material and the accumulation of grease which enters the cesspool as a result of kitchen use and the like results in increasingly inefficient functioning of the cesspool. Therefore, in every instance, when waste material is discharged, there is need of purifying it so that it will not result in stoppage of cesspools or will not add to the pollution of our streams and rivers.

Accordingly, it is an object of the present invention to provide a tablet which can be used in the toilet or urinal and which includes therein a substance which will act to bacteriologically decompose the waste material introduced into the sewage or cesspool systems.

It is also an object to achieve this result by the utilization of simple, inexpensive and easy to use substances and devices.

FIG. 1 is a perspective view of a preferred structure made in accordance with the present invention.

FIG. 2 is a perspective view of the structure shown in FIG. 1 in affixed position on a toilet or the like.

FIG. 3 is a cross-sectional view taken from axis III—III of FIG. 2.

There are presently known structures which are attachable to the bowl area of a toilet or urinal. These structures have thereto attached material which acts as a deodorizing means. By designing these structures so that this material is positioned in contact with the bowl area in such a way that water flowing into the bowl from the toilet tank or other supply area passes thereover (FIG. 3), this material will be caused to be introduced into the water stream. One of these devices is illustrated in FIG. 1. By including in the material a substance which when introduced into the fluid stream and which when joined in the sewage disposal system, or cesspool, will act to increase the decomposition rate of the waste material contained in the system, this will result in a more efficiently operating cesspool and a cesspool unit which will operate for longer periods of time without breakdown and which in sewage systems will operate to effect a higher degree of depollution of the waste material prior to and during the sewage treatment operation. The substance which is presently preferred is yeast and preferably that yeast is used which is described as moist yeast.

So that the sewage treatment process and the decomposition process will be more efficient, an agent for cutting or dissolving grease such as orthodichlorobenzene, and the like may be added to the yeast or the like.

The preferred structure which is utilized to bring into fluid contact the substance which will act to decompose the waste material is illustrated perspectively in FIG. 1. The attaching structure 10 is generally made of plastic and the arms 21, 22 extend inwardly toward each other so that when this structure is mounted to the rim of the toilet bowl 30, the arms are forced apart and therefore resiliently urge the tablet 20, which has therein incorporated the decomposition accelerator and grease cutter, into contact with the bowl itself and by being so positioned, the water which passes from the toilet tank 32, through the toilet bowl channel 33 and which enters the bowl at apertures 21 is caused to pass thereover and therearound. The remainder of the tablet 20 may be comprised of naphthalene, resin and pine oils or any of the many similar well known substances which are now utilized in tablets of this type.

I claim:
1. The method for treating sewage and the like by introducing a substance for bacteriologically decomposing waste material present in a waste collection unit which comprises forming a cake containing said substance in a form to be partially eroded by flush water passing thereover and including in said cake a suspension means, locating that cake by means of said suspension means in a position within a toilet bowl above the normal level of water therein but in such a position that flush water passes thereover to partially erode the cake each time the bowl is flushed whereby a portion of the substance of said cake will be flushed into said waste colection system to enhance bacteriological decomposition within subsequent parts of the system.

2. A method according to claim 1, wherein said source additionally includes a grease dissolving agent.

3. The method according to claim 2, wherein said grease dissolving agent is orthodichlorobenzene.

4. A method according to claim 1 wherein said substance is yeast.

References Cited

UNITED STATES PATENTS 2,528,403   10/1950   West _____ 210—11

OTHER REFERENCES

Pomeroy, R.: Experience With Up-Sewer Clorben Treatment, Etc., Sewage and Ind. Wastes, vol. 23, April 1951, pp. 465–477 (P.O.S.L.).

Larson: 1954 Operator's Forum, vol. 27, Sewage and Ind. Wastes, May 1955, pp. 612–625 (P.O.S.L.).

MICHAEL ROGERS, Primary Examiner